Sept 17, 1957    T. H. FAIRCLOUGH    2,806,723
TELESCOPIC SUPPORT DEVICE
Filed June 16, 1955
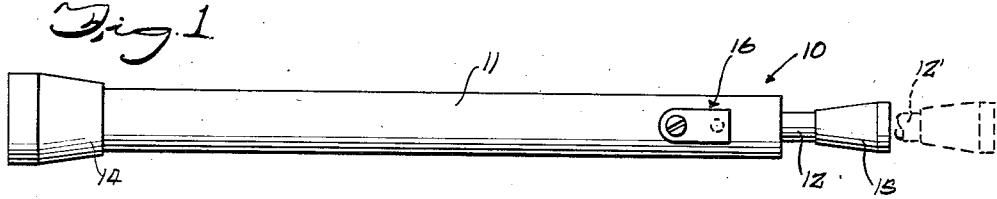
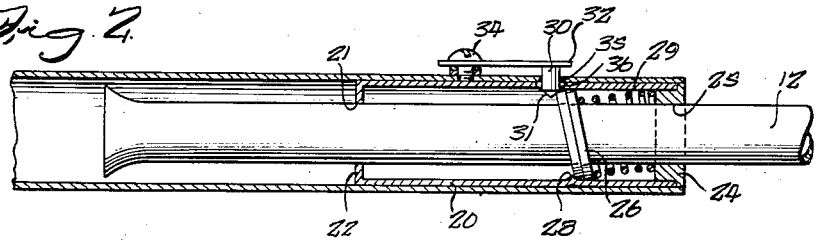
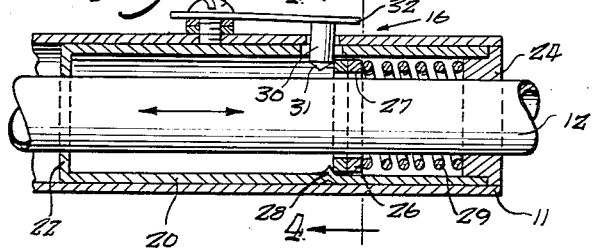
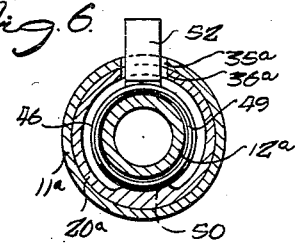
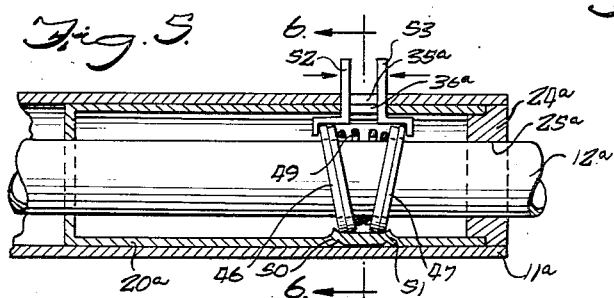
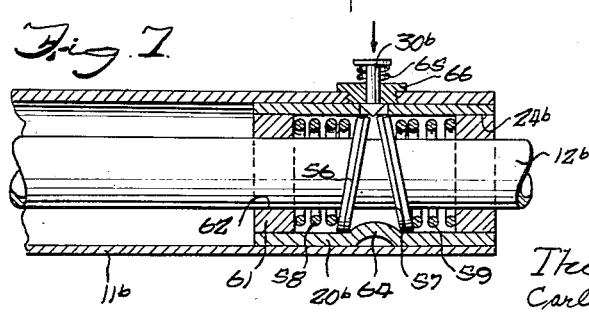
Inventor
Thomas H Fairclough
Carlson, Pitzner, Hubbard & Wolfe
Attorneys

United States Patent Office 2,806,723
Patented Sept. 17, 1957

2,806,723

TELESCOPIC SUPPORT DEVICE

Thomas H. Fairclough, Sandwich, Ill.

Application June 16, 1955, Serial No. 515,861

8 Claims. (Cl. 287—58)

The present invention pertains generally to an improved telescopic support useful for extensible table legs, article stands, ironing boards, and the like, where height adjustment combined with firm support are desired. In another aspect, the invention pertains to a support which is useful as a temporary prop, for example, in supporting an automobile hood incident to servicing. More particularly, the invention relates to a novel locking device structure which includes means for locking the telescopic support in any desired position and which can be readily released to permit adjustment of the support.

One of the objects of the invention is to provide a telescopic support of the foregoing character and having a cartridge type locking structure susceptible of complete enclosure within the outer tube and which permits the cartridge to be installed as a unit.

Another object is to provide a telescopic support of the type set forth and having a locking structure which is positive and reliable in its locking action and susceptible of simple and economical manufacture.

Other objects and advantages will become apparent to those skilled in the art as the following detailed description proceeds, taken in connection with the accompanying drawings, wherein:

Figure 1 is a side elevation of a telescopic support embodying the present invention.

Fig. 2 is a longitudinal section, of one embodiment of the present invention and with the support partially extended.

Fig. 3 is an enlarged fragmentary section, of the same embodiment as shown in Fig. 2, but with the locking device released to permit adjustment.

Fig. 4 is a view taken on line 4—4 in Fig. 3.

Fig. 5 is a longitudinal, fragmentary section, of a telescopic support having a modified form of the locking device.

Fig. 6 is a view taken on line 6—6 in Fig. 5.

Fig. 7 is a longitudinal, fragmentary section of a telescopic support comprising still another modification of the present locking device.

While the invention is susceptible of various modifications and alternative constructions, certain preferred embodiments have been shown in the drawing and will be described below in detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to the drawing, there is shown in Fig. 1 a telescopic support 10 embodying the present invention. This support generally comprises an outer cylindrical tube 11 and an inner cylindrical tube or rod 12 slipped within the outer tube 11. Rubber or plastic tips 14 and 15 are slipped over the exposed ends of tube 11 and rod 12 respectively to prevent the marring of any painted or otherwise finished surfaces upon which the support may be used and, in addition, to prevent the support from slipping when under a load imposed in a direction at an angle to the axis of the support.

The support is so constructed as to permit an extension thereof, for example to the position shown in phantom at 12' in Fig. 1.

A cartridge contained lock mechanism, illustrative of the present invention, is provided as shown in Fig. 2 in order to hold the tubes in the desired extended position. The cartridge unit comprises, in general, a shell 20 adapted to be inserted within outer tube 11 and fixed thereto, for example, by employing a press fit between the shell 20 and the tube. An opening 21 is provided in the inner end 22 of the shell 20 and of slightly larger diameter than the diameter of the rod 12 to provide a bearing surface for the rod as it passes through the cartridge unit. An annular guide bushing 24 having an opening 25 is inserted in the outer end of the shell to close the end and to serve as a second bearing surface for the rod, thereby providing a complete slidable support for the rod within the cartridge unit 20 and the tube 11.

Mounted within the shell 20 and surrounding the rod 12 are one or more annular washers 26 of steel or other hard metal. The apertures 27 of the washers through which the rod passes are of slightly larger diameter than the outside diameter of the rod. A spring 29, shown for example in the form of a helical compression spring, is arranged within the shell 20 so as to surround the rod 12 and be interposed between the washers 26 and the bushing 24. A nub 28 projecting from the shell on the opposite side of the washers from the spring, serves as a fulcrum, the nub being formed for example by indenting the wall of the cartridge. The washers, bearing on the fulcrum, are urged by the spring to a canted position, as shown in Fig. 2, where they bear against the outer surface of the rod 12 and tend to hold it from moving in one direction. To facilitate the holding action the inner edges of the washers are preferably square cut and the inner tube is formed of relatively softer material such as aluminum grade 615T6.

In order to release the rod 12 within the tube 11, a trigger or release 16 is provided. This release, mounted on the outer tube 11, comprises a plunger 30 having an angled face 31 suitable for bearing against and moving washers 26 against the force of the spring 29 and in a direction axial of rod 12. A spring 32, such as a leaf spring as shown in Fig. 2, is secured to the outer end of the plunger 30 and is fastened on the outer tube 11, for example by a screw or rivet 34. The plunger extends through a hole 35 in tube 11 cooperating with hole 36 in shell 20, the holes being in register to provide access to the canted washers.

When it is desired to extend the tube 11 and rod 12 (Fig. 2) telescopically, all that is necessary is to pull the two sections axially apart. When this occurs, the washers are moved against the resistance of the helical compression spring 29 to a position more nearly at right angles to the axis of the tube and rod. Since the opening through the washers is slightly larger than the outside diameter of the rod 12, the rod may be moved outwardly with free sliding action. As soon, however, as the outward pull is released, or when pressure is applied in the opposite direction, the washers 26 are forced back to the canted position shown in Fig. 2 by the coaction of the helical compression spring 23 and the nub or fulcrum 28. The greater the axial collapsing pressure imposed upon the telescopic structure, the greater the binding action of the canted washer 26; hence, it will be seen that this washer provides an adequate latch against any collapsing movement of the telescopic tube and rod, but at the same time permits ready extension thereof.

When it is desired to nest the tube and rod the user merely presses the release 16, as shown in Fig. 3, so that the bearing surface 31 of plunger 30 acts against the periphery of washers 26 forcing them to assume a position at right angles to the axis of rod 12. The inner rod 12 can then be freely moved axially in either direction as indicated by the double-headed arrow in Fig. 3.

Turning now to Fig. 5, there is shown a somewhat modified locking mechanism also employed in a cartridge type locking unit embodying the present invention, corresponding reference numerals being used, where applicable, with a suffix "a." In this modification, two sets of washers 46 and 47 of the same general type and description as the washers 26 discussed previously are provided within the shell 20a and surrounding the rod 12a. Spring 49 is interposed between the two sets of washers and inwardly projecting nubs 50 and 51 are provided on the shell 20a for fulcruming the sets of washers 46 and 47. With this particular lock construction, a two-way grip is provided so as to prevent the movement of rod 12a in either direction relative to outer tube 11a. Opposed release members 52 and 53 are provided extending through the registering openings 35a and 36a in the tube 11a and cartridge 20a respectively. When it is desired to move the tube 12a in either direction, the user pinches the members 38a and 39a together and this action moves the washers 46 and 47 to a position at right angles with respect to the axis of rod 12 (Fig. 6), thereby permitting movement of the rod through the washers.

Referring to Fig. 7, there is shown a double acting locking device which is similar in many respects to that shown in Fig. 3, corresponding reference numerals being used, where applicable, with a suffix "b." Washer members 56 and 57 of the type described above, surround the rod 12b and spring members 58 and 59 have been positioned to act in conjunction with the washer members 56 and 57 respectively to prevent movement of rod 12b in either direction. A removable end member 61 providing a second bearing surface 62 has been provided to facilitate assembly although it will be apparent that the member may be integral with the cartridge shell if desired. It should also be noted that nub 64, being somewhat larger than in the previous embodiments, serves as a fulcrum for both the washers 56 and 57. Release plunger 30b in the present embodiment is biased by a coil spring 65. This plunger is secured to the outer tube 11b by a threaded bushing 66 which surrounds the plunger and also provides a bearing surface for the spring 65.

The operation of the locking devices shown in Figs. 5 and 7 is similar to that in Fig. 3 except that the release members must be operated to free the rod for movement in either direction.

In each of the above described embodiments of my invention it will be noted that the locking cartridge is self-contained within the narrow annular space between the outer tube and the central rod. Consequently, the outer surface of the device is free of enlargements which adds to the appearance of the device and increases its utility by enabling its use in confined spaces. The cartridge may be constructed separately and inserted as an assembled unit into the outer tube where it is held in place by a press fit or, if desired, by pins or screws. After the cartridge is oriented in the outer tube with the release openings 35 and 36 in register the release member may be added. This is accomplished in Figs. 2 and 3 by the machine screw 34 and in Fig. 7 by screwing in the release assembly consisting of the release plunger 30b and its bushing 66. In Fig. 5, the device is assembled by pushing the cartridge in part way, inserting the release member 52, then pushing the cartridge in beyond its normal position and inserting the member 53, and finally orienting the cartridge so that openings 35a and 36a are in register. If a press fit is to be used the cartridge is oriented in its final position by applying a force on its inner end. Or alternatively, the cartridge may be secured in position by a pin or the like, or by deforming the tube to grip the cartridge.

In applications where it is desired to use the telescopic device as a table leg, such as on a folding ironing board, the rubber tip 14 is replaced by a hinge or pin which is secured to the underside of the ironing board in such a manner that the leg is free to be folded flat against the undersurface of the ironing board, or be pivoted to its open position for supporting the board. When used as a leg, it will be necessary to provide a suitable brace or latch to hold the leg in the unfolded table supporting position. This latch may be of the type generally used by those skilled in the art, and, there being sufficient clearance between the inner rod and the outer tube, it may be attached to the outer tube without interfering with the telscoping feature of the leg.

The telescoping leg structure for an ironing board as described above not only enables the legs to be folded more compactly for storage, but also permits the adjustment of the legs to the desired height for the convenience of the user when ironing.

I claim as my invention:

1. For use with a support including an outer tube and a rod telescoped therein, the outer tube having an aperture in the side wall thereof and a release member mounted thereon and movable inwardly and outwardly of said aperture, a locking cartridge comprising a cylindrical shell fixed within the outer tube and having annular end members providing an opening for slidably receiving said rod and for supporting said rod at spaced points, said cartridge having locking means mounted therein for engaging the rod, and said cylindrical shell having an aperture registrable with the aperture in the outer tube and through which the release member projects for releasing said locking means to disengage the rod for movement relative to the tube.

2. For use with a support including an outer tube and a rod telescoped therein, the outer tube having an aperture in the side wall thereof and a release member mounted thereon and movable inwardly and outwardly of said aperture, a locking cartridge comprising a cylindrical shell fixed within the outer tube and having annular end members providing an opening for slidably receiving said rod and for supporting said rod at spaced points, said cartridge having locking means mounted therein including a washer fulcrumed along an outer edge and a biasing means for urging said washer into a canted position in which the inner edges of said washer bite into the surface of the rod, and said cartridge having an aperture in a wall thereof registrable with the aperture in the outer tube and through which the release member projects for tilting the washer out of its canted position and against the force of said biasing means to release the rod for movement relative to the tube.

3. For use with a support including an outer tube and a rod telescoped therein, the outer tube having an aperture in the side wall thereof and a release member mounted thereon and movable inwardly and outwardly of said aperture, a locking cartridge comprising a cylindrical shell fixed within the outer tube and having annular end members providing an opening for slidably receiving said rod and for supporting the rod at spaced points, said cartridge having locking means mounted therein including a pair of spaced apart washers fulcrumed along an outer edge and a biasing means for urging said washers into a canted position in which the inner edges of said washers bite into the surface of the rod, and said cylindrical shell having an aperture registrable with the aperture in the outer tube and through which the release member projects for tilting said washers out of their canted position and against the force of said biasing means to release the rod for movement relative to the tube.

4. In a telescopic support device, the combination of a pair of coaxial telescoping members, the outer member of which is of tubular form for receiving a part of the inner member, with a locking cartridge fixed entirely within said outer member, said locking cartridge comprising a shell having annular end members providing openings for slidably receiving said inner member and for supporting said inner member at spaced points, and a locking means disposed within said shell for engaging said inner member, said outer member and said locking cartridge having registering apertures, and a release member extending through said apertures and operatively connected to said locking means for releasing said inner member for movement relative to said outer member.

5. In a telescopic support device, the combination of a pair of coaxial telescoping members, the outer member of which is of tubular form for receiving a part of the inner member, with a locking cartridge fixed entirely within said outer member, said locking cartridge comprising a shell having annular end members providing openings for slidably receiving said inner member and for supporting said inner member at spaced points, an annular locking means encircling said inner member, and a biasing means having one end bearing against said locking means and its other end against one end of said shell to urge said locking means into a locking position, said outer member and said locking cartridge having registering apertures, and a release member extending through said apertures and operatively connected to said locking means for releasing said inner member for movement relative to said outer member.

6. In a telescopic support device, the combination of a pair of coaxial telescoping members the outer member of which is of tubular form for receiving a part of the inner member, with a locking cartridge fixed entirely within said outer member, said locking cartridge comprising a shell having annular end members providing openings for slidably receiving said inner member and for supporting said inner member at spaced points, a pair of spaced apart annular locking means fulcrumed within said shell and adapted to encircle said inner member, and a biasing means disposed intermediate said pair of locking means and urging apart said locking means to a locking position for restraining said inner member against movement, said outer member and said locking cartridge having registering apertures, and a release member extending through said apertures and operatively connected to both of said locking means for releasing said inner member for movement relative to said outer member.

7. In an extensible support the combination comprising: an outer tube; a rod telescopically received in said tube and spaced from the inner wall thereof; a locking cartridge interposed between said tube and said rod and fixed within said tube, said locking cartridge comprising a cylindrical shell having annular end members for guiding said rod in its endwise movement and for supporting said rod at spaced points, locking means including a canted washer, a fulcrum on the inner wall of said shell for engaging one edge of said washer, and a spring for urging said washer into a canted locking position; said tube and said cartridge having registering apertures; and a release member extending through said apertures and arranged to engage said washer opposite its point of fulcruming, said release member being so constructed and arranged that upon manual operation thereof said washer is moved out of its canted position against the biasing force of said spring to admit relative movement of the rod in said tube.

8. In an extensible support the combination comprising: an outer cylindrical tube; a rod telescopically received in said tube and spaced from the inner wall thereof; a locking cartridge interposed between said tube and said rod and fixed within said tube, said locking cartridge comprising a cylindrical shell having annular end members for guiding said rod in its endwise movement and for supporting said rod at spaced points, locking means including a pair of spaced apart canted washers, a fulcrum on an inner wall of said shell for engaging one edge of said washers, and biasing means for urging said washers into a canted locking position; said tube and said cartridge having registering apertures; and release means extending through said apertures and arranged to engage said washers opposite their points of fulcruming, said release means being so constructed and arranged that upon manual operation thereof said washers are moved out of their canted position against the biasing force of said biasing means to admit relative movement of the rod in said tube.

References Cited in the file of this patent

UNITED STATES PATENTS

| Number | Name | Date |
|---|---|---|
| 836,303 | Christensen | Nov. 20, 1906 |
| 1,007,322 | Barnes | Oct. 31, 1911 |
| 2,090,550 | Pilblad | Aug. 17, 1937 |
| 2,261,505 | Schlesinger | Nov. 4, 1941 |